United States Patent Office 3,322,572
Patented May 30, 1967

3,322,572
PROCESS FOR APPLYING AN OLIGOMERIC BIS-(CYCLOPENTADIENYL) RESIN ON A WIRE
Alfred Renner, Allschwil, and Franz Rudolf Widmer, Basel, Switzerland, assignors to Ciba Limited, Basel, Switzerland, a Swiss company
No Drawing. Filed Dec. 10, 1962, Ser. No. 243,607
4 Claims. (Cl. 117—232)

Many of the known organic plastics have already been proposed for use as electrical insulating materials. Curable plastics particularly widely used on a large scale in industry are the phenoplasts, aminoplasts, epoxy resins and unsaturated polyester resins.

The aforesaid plastics are suitable for the manufacture of electrical insulating components by various manufacturing methods, such as casting, moulding, laminating or as surface coatings, and the resulting components are in general good electrical insulators and display good mechanical strength, thermal and dimensional stability. While the insulating materials referred to above prove satisfactory when used as D.C. or low-frequency A.C. insulators, they have a serious disadvantage when used in the high-frequency range:

Owing to the presence of polar atoms (above all oxygen and nitrogen) or atomic groupings, for example hydroxyl, carboxyl, carbonyl, ester, ether, acetal, amino or imino groups, they absorb energy of high-frequency A.C. and convert it into heat. A numerical measure for the degree of the conversion of field energy into heat is the dielectric loss factor tg δ. Owing to the high dielectric loss and their considerable dependence on frequency and on temperature this class of substance has only found restricted use in high-frequency insulation.

On the other hand, certain thermoplastic resins, for example polyolefines such as polystyrene, polyethylene or polypropylene, are free from polar atoms and atomic groupings and in consequence they display extremely good dielectric properties even in the range of extremely high-frequencies. However, in view of their thermoplasticity their usefulness is limited to relatively low temperature ranges below their softening point. In addition, they are solid substances that can be made into compact solid objects only by certain, special methods, for example by injection moulding or by a cutting operation.

It has also been proposed to cross-link oily or resinous polymers of butadiene at high temperature (225 to 300° C.) or with the aid of vinyl polymerization initiators, optionally in the presence of vinyl monomers for example styrene. This cross-linking of such polymers is possible only to a minor degree and the products thus obtained are soft and plastic even at room temperature and their mechanical strength is very poor. Insulating components manufactured in the aforesaid manner are, therefore, in many respects inferior to those made from the aforementioned thermosetting plastics.

Surprisingly, it has now been found that electrical insulating components that absorb field energy to a very minor extent even in the range of the highest field frequencies (for example $10^{10}$ cycles) can be manufactured by curing soluble and fusible oligomers of hydrocarbons, whose molecule contains two cyclopentadienyl groups, at a temperature above 150° C. The solid bodies obtained in this manner are infusible and insoluble and are distinguished by outstanding dielectric properties and by a very high heat distortion and by good mechanical strength, hardness and dimensional stability.

Accordingly, the present invention relates to the use for electrical purposes, more especially in high-frequency technology of dimeric or oligomeric bis(cyclopentadienyl) compounds, which are either liquid at room temperature or fusible and soluble in organic solvents, corresponding to the general formula (I) 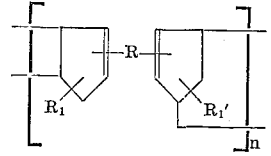

in which R represents a residue

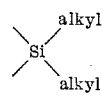

or

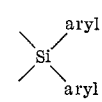

or a bivalent aliphatic, cycloaliphatic, araliphatic or aromatic hydrocarbon radical with preferably 3 to 10 carbon atoms; $n$ is a whole number from 2 to 20, and $R_1$ and $R_1'$ each represents a hydrogen atom or a methyl group—by themselves or in conjunction with liquid or fusible polymers or copolymers of dienes (such as butadiene or isoprene) which are soluble in organic solvents, which can be directly converted into cured, insoluble and infusible resins by heating.

As dimeric or oligomeric bis(cyclopentadienyl) compounds of the Formula I, the following substances are suitably in the form of their dimers or oligomers:

Bis(cyclopentadienyl)methane,
Bis(cyclopentadienyl)phenylmethane,
1,3-bis(cyclopentadienyl)propane,
1,5-bis(cyclopentadienyl)pentane,
1,6-bis(cyclopentadienyl)hexane,
1,9-bis(cyclopentadienyl)nonane,
1,4-bis(cyclopentadienyl)butene-2,
α,α'-Bis(cyclopentadienyl)-para-xylene,
4,6-bis(cyclopentadienylmethyl)-1,3-dimethylbenzene,
1,3-bis(cyclopentadienyl-methyl)-2,4,6-trimethylbenzene,
1,4-bis(cyclopentadienyl)cyclopentene-2,
Dicyclopentadienyl-dimethylsilane,
Bis(methyl-cyclopentadienyl)-dimethylsilane, and
Dicyclopentadienyl-diphenylsilane.

These dimeric or oligomeric bis(cyclopentadienyl) compounds are accessible by reacting alkali metal compounds or Grignard compounds of cyclopentadiene or methylcyclopentadiene with dihalogen compounds of the formula (II)  X—R—X in which R has the same meaning as in Formula I and each X stands for a halogen, preferably chlorine or bromine atom—and subsequently heating the reaction mixture. In the reaction of the metal compound of cyclopentadiene or methylcyclopentadiene there are primarily formed monomeric bis-cyclopentadienes of the formula (III) 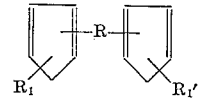

in which R, $R_1$ and $R_1'$ have the same meanings as in Formula I.

The monomers are very reactive and are in many cases converted into the oligomers by Diels-Alder addition with themselves. It is of advantage to accelerate this autoreaction by heating, for example to 80–150° C. The oligomers constitute oils, viscous liquids or fusible solid resins, depending in the first place on the type of the bivalent radical R and on the polymerisation degree $n$. In general, they are soluble in suitable solvents, for example in aromatic hydrocarbons or halogenalkanes. Frequently, they constitute mixtures of oligomers having a different degree of polymerisation $n$. The experimentally determined magnitude of $n$ represents in such a case an average value so that it need not be a whole number. The most frequently found values of $n$ range from 2 to 10; with some structures, such as when R represents

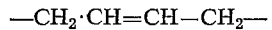

or

the value $n=2$ seems to occur most frequently.

Dimeric or trimeric para-xylylene-bis-cyclopentadiene and its conversion by emulsion polymerisation into a high molecular thermoplastic material soluble in organic solvents have been described in U.S. Patent No. 2,726,232.

When the above thermoplast is pressed at 200° C. under a high pressure, a film is obtained which does not melt up to 360° C. and possesses good electrical properties. This produced in expert circles the obvious misconception that such a cumbersome two-stage operation which, moreover, is suitable only for the manufacture of shaped foils, is imperative for the manufacture of insulating components having good electrical properties. Since such a method is unsuitable for grouting, impregnating, lacquering or cementing electrical components—for which purposes, moreover, the curable resin cannot be used as a thermoplast of high molecular weight but must be used in liquid or castable form and then immediately converted into the cured, infusible state—the observation forming the base of the present invention could certainly not have been deduced from U.S. Patent No. 2,726,232.

Other dimeric or oligomeric bis(cyclopentadienyl) compounds suitable for use in the present process, for example the preferably used dimeric 1,4-bis(cyclopentadienyl) butene-2, are new. However, neither these new compounds nor the process for their manufacture are included in the present application.

The optionally further used soluble and liquid or fusible polymers and copolymers of dienes are preferably derived from isoprene or butadiene. They should be substantially free from polar atoms and atomic groupings to ensure good dielectric properties also in the high-frequency range. Particularly suitable copolymers are those of butadiene or isoprene with ethylene, propylene or styrene. A typical representative of this type of compound is, for example, the product marketed under the trade name "Buton 100."

The curing of the dimeric or oligomeric bis(cyclopentadienyl) compounds by themselves or in combination with soluble and liquid or fusible polyisoprenes or polybutadienes of the "Buton" resin type is carried out by heating, preferably within a temperature range of 150 to 200° C.

At room temperature the dimeric or oligomeric bis(cyclopentadienyl) compounds are in general stable at least sufficiently long to enable them to be used in industry as casting resins, laminating resins, adhesives or the like. Whereas, for example, dimeric or trimeric para-xylylene-bis-cyclopentadiene has only a restricted pot life, dimeric 1,4-bis(cyclopentadienyl)-butene-2 is especially distinguished by a surprising, outstanding shelf life and is practically indefinitely storable at room temperature. Even after a fortnight's storing at 100° C. the viscosity of the resin has only doubled.

This fact is of special industrial importance because it makes the new products suitable for the manufacture of storable, thermosetting one-component systems to be used, for example, as casting resins, lacquers, laminating resins, moulding compounds or adhesives.

Furthermore, the curable compounds can be mixed at any stage before curing with the substances conventionally added to curable plastics, such as fillers, plasticisers, pigments, dyestuffs, mould lubricants, flame-inhibitors or the like.

In the preferred use of the new compounds in high frequency technology the choice of such additives will, of course, be restricted to non-polar or only weakly polar substances. As fillers conventionally used for high-frequency insulators there may be mentioned, for example, quartz meal, muscovite, rutil, titanium dioxide/zirconium dioxide and magnesium titanate.

The curable compounds of dimeric or oligomeric bis(cyclopentadienyl) compounds by themselves or in combination with soluble polymers or copolymers of dienes, such as butadiene, are suitable for electrical insulation, for example, for wires, cables, coils, windings or the like, as impregnating and covering resins and lacquers. On being heated, the compound hardens to form a hard, tough resin. The curable compounds may also be used for potting and grouting. Laminated magnet cores, for example, can be immersed in such liquid mixtures, if necessary with vacuum or pressure impregnation, with the liquid compound readily filling in all interspaces between the lamellae. On heating, the compound hardens between the lamellae quickly and forms a hard, tough, well adhering binder which results in a solid core of tightly cemented lamellae. Electrical transformers, instrument-transformers, rectifiers and electrical components of a wide variety, such as condensers, frequency filters, diodes, transistors, switch and storage elements of magnetic material for computers, magnetisible and magnet components etc. can be embedded and potted in the curable compounds of the invention. Furthermore, the new compounds can be cast and moulded to produce shaped structural components for electrical installations, such as rotor or stator parts, insulating bodies for converters, electrical switch gear, quenching chambers and the like, as well as for the manufacture of insulating laminates, for example for printed circuitry.

Parts and percentages in the following examples are by weight, and the relationship between part by weight and part by volume is the same as between the kilogram and the liter.

The curing reactions performed in the examples were performed with the following bis(pentadienyl) compounds I to IV:

I. OLIGOMERIC 1,5-BIS(CYCLOPENTADIENYL) PENTANE 110 parts of sodium metal are fused in 875 parts of xylene, finely dispersed and then cooled. 20 parts of tertiary butanol and 1.5 parts of tertiary butylcatechol are added and while cooling the whole externally 370 parts of monomeric cyclopentadiene are stirred in dropwise at 45° C. The batch is left to itself for 14 hours at 20° C. under nitrogen. At 50 to 55° C. 460 parts of 1,5 dibromopentane are added and the mixture is stirred for another 2 hours at 80° C. Titration of the bromine ions reveals that a quantitative conversion has occurred. The batch is cooled to room temperature, mixed with 80 parts of methanol and 1000 parts of water and neutralized with 30 parts of acetic acid, then thoroughly mixed, and the aqueous layer is separated and the xylene solution is dried over sodium sulfate and filtered. The xylene is distilled off under 15 mm. Hg pressure and the reaction product is kept under this pressure for 3 hours at 100° C.

Yield: 390 parts of oligomeric 1,5-bis(cyclopentadienyl)pentane (=97.5% of the theoretical yield) in the form of a light brown resin is just still liquid at room temperature.

*Analysis.*—Calculated: C, 90.0%; H, 10.0%. Found: C, 89.8%; H, 10.0%; molecular weight, 1600.

II. DIMERIC, 1,4-BIS(CYCLOPENTADIENYL) BUTENE-(2)

While cooling externally a suspension of cyclopentadienyl sodium prepared as described above under I from 2080 parts of xylene, 276 parts of sodium, 35.5 parts of tertiary butanol, 0.5 part of phenyl-$\beta$-naphthylamine and 872 parts of cyclopentadiene, 712 parts of 1,4-dichlorobutene-2 are stirred in at 30 to 35° C. The temperature is then raised and maintained for 3 hours at 105° C. Titration of the lakalinity reveals that a quantitative conversion has taken place. The batch is filtered at room temperature and the sodium chloride formed is washed with 5 x 400 parts of xylene. The xylene is evaporated at a pressure of 15 mm. Hg and the residue is kept for 1 hour at 100° C. under 1mm. Hg pressure.

Yield: 978 parts of dimeric 1:4-bis(cyclopentadienyl)-trans-butene-(2) [=93.2% of the theoretical yield calculated from 1,4-dichlorobutene-2] in the form of a light-brown, thickly liquid oil, having a viscosity of 83,000 centipoises at 20° C.

*Analysis.*—Calculated: C, 91.25%; H, 8.75%; molecular weight 368. Found: C, 90.1%; H, 9.0%; molecular weight, 403.

III. DIMERIC DICYCLOPENTADIENYL-DIMETHYLSILANE

As described under I a suspension of cyclopentadienyl sodium is prepared from 875 parts of xylene, 115 parts of sodium, 20 parts of tertiary butanol, 1.5 parts of tertiary butylcatechol, and 363 parts of cyclopentadiene.

This suspension is reacted at 30 to 35° C. with 322.5 parts of dimethyldichlorosilane. The batch is allowed to react for another hour at 80° C., then washed, dried with sodium sulfate, the xylene is distilled off and the residue is finally heated for 1 hour at 15 mm. Hg at 150° C. with the use of a descending condenser. Yield: 353 parts (=75% of the theoretical) of dimeric dicyclopentadienyl-dimethylsilane as a medium viscous, yellowish brown liquid.

*Analysis.*—Calculated: Molecular weight, 376; silicon, 14.9%. Found: molecular weight, 390; silicon, 14.3%.

IV. DIMERIC, $\alpha,\alpha'$-BIS(CYCLOPENTADIENYL)-PARA-XYLENE 138 parts of metallic sodium in the form of small particles of about $20\mu$ diameter are suspended in 900 parts of anyhydrous tetrahydrofuran.

18 parts of tertiary butanol are then added and while refluxing the batch 435.6 parts of monomeric cyclopentadiene are then stirred in dropwise with external cooling at a rate such that the temperature of the reaction mixture remains constant at 40 to 45° C. The reaction is allowed to subside within 3½ hours and, while again stirring and cooling externally, a solution of 516 parts of $\alpha,\alpha'$-dichloro-para-xylene in 1350 parts of tetrahydrofuran is added dropwise at an internal temperature of 30 to 35° C. The whole is stirred for 16 hours at room temperature and neutralized with acetic acid, then the precipitated sodium chloride is filtered off, the filter cake is repeatedly washed with xylene, and the clear filtrate is heated for 2 hours at 70° C. and then evaporated under vacuum at 40° C. in a falling-film evaporator, finally under a pressure of 1 mm. Hg, to yield 475 parts of dimetric $\alpha,\alpha'$-bis-(cyclopentadienyl)-para-xylene in the form of a reddish brown liquid. Molecular weight: Found 465. Calculated 468.

Example 1

Viscid, oligomeric 1,5-bis(cyclopentadienyl) pentane having an average molecular weight of 1600 [=bis(cyclopentadienyl) compound I] is cast into aluminium moulds 42 x 11 x 130 mm. and 130 x 130 x 2 mm., respectively and cured for 24 hours at 180° C. There are obtained very tough, perfect, clear castings. The castings obtained from the first-named moulds are used for determining the mechanical properties and those from the other moulds for measuring the dielectric properties. The following values are obtained:

| | |
|---|---|
| Flexural strength kg./cm.$^2$ | 720 |
| Impact strength cm. kg./cm.$^2$ | 24.5 |
| Modulus of elasticity kg./mm.$^2$ | 251 |
| Heat distortion point according to Martens (DIN) ° C. | 47 |

Dependence of the dielectric properties of the castings on the frequency and temperature:

| Frequency, sec.$^{-1}$ | Temperature,° C. | Dielectric loss factor, tg $\delta \times 10^2$ | Dielectric constant, $\epsilon$ | Specific resistance, ohm-cm. |
|---|---|---|---|---|
| 50 | 22 | 0.10 | 2.5 | 1.9×10$^{17}$ |
| 50 | 40 | 0.30 | 2.5 | 1.4×10$^{17}$ |
| 50 | 55 | 0.44 | 2.5 | 7.8×10$^{16}$ |
| 50 | 75 | 0.14 | 2.5 | 7.8×10$^{15}$ |
| 50 | 100 | 0.07 | 2.5 | 7.4×10$^{14}$ |
| 50 | 125 | 0.07 | 2.5 | 8.2×10$^{15}$ |
| 50 | 150 | 0.15 | 2.5 | 1.5×10$^{13}$ |
| 50 | 175 | 0.48 | 2.5 | 3.2×10$^{12}$ |
| 50 | 190 | 3.40 | 2.5 | 5.1×10$^{11}$ |
| 50 | 210 | 11.1 | 2.6 | 1.4×10$^{11}$ |
| 50 | 20 | 0.10 | 2.5 | |
| 10$^3$ | 20 | 0.64 | 2.5 | |
| 10$^5$ | 20 | 0.16 | 2.5 | |
| 10$^6$ | 20 | 0.19 | 2.3 | |
| 10$^7$ | 20 | 0.30 | 2.3 | |

Example 2

Liquid, dimeric 1,4-bis(cyclopentadienyl)-trans-butene-2 [=bis(cyclopentadienyl) compound II] is cast into moulds 42 x 11 x 130 mm. and 130 x 130 x 2 mm. respectively. Using the under-mentioned curing conditions, there result hard, clear, perfect castings having the following properties:

| Specimen | Curing conditions | Flexural strength, kg./mm.$^2$ | Impact strength, cm. kg./cm.$^2$ | Modulus of elasticity kg./mm.$^2$ | Heat distortion point accdg. to Martens (DIN) ° C. | Water absorption within 1 hour at 100° C., percent |
|---|---|---|---|---|---|---|
| 1 | 12 hrs./160° C. plus 6 hrs./180° C. | 5.7 | 3.5 | 481 | 100 | 0.04 |
| 2 | As 1 plus 6 hrs. at 200° C. | 5.7 | 3.4 | 448 | 218 | 0.05 |
| 3 | As 2 plus 6 hrs. at 220° C. | 6.3 | 3.25 | 478 | 234 | 0.04 |
| 4 | As 3 | 5.1 | 3.1 | 495 | 245 | 0.06 |

Dependence of the dielectric properties of the castings (Specimen 4) on the frequency and the temperature:

| Frequency, sec.$^{-1}$ | Temperature, °C. | Dielectric loss factor, tg $\delta \times 10^2$ | Dielectric constant, $\epsilon$ | Specific resistance, ohm-cm. |
|---|---|---|---|---|
| 50 | 20 | 0.01 | 3.1 | |
| 10$^4$ | 20 | 0.53 | 2.35 | |
| 10$^5$ | 20 | 0.49 | 2.30 | |
| 10$^6$ | 20 | 0.45 | 2.45 | |
| 10$^7$ | 20 | 0.36 | 2.44 | |
| 5×10$^7$ | 20 | 0.33 | 2.37 | |
| 10$^8$ | 20 | 0.83 | 2.46 | |
| 2.5×10$^8$ | 20 | 1.05 | 2.38 | |
| 0.96×10$^{10}$ | 20 | 0.1 | 3.04 | |
| 50 | 25 | 0.01 | 3.1 | >2×10$^{17}$ |
| 50 | 50 | 0.05 | 3.1 | 2.7×10$^{16}$ |
| 50 | 75 | 0.02 | 3.1 | 1.3×10$^{16}$ |
| 50 | 100 | 0.01 | 3.1 | 1.1×10$^{16}$ |
| 50 | 125 | 0.02 | 3.1 | 1.1×10$^{15}$ |
| 50 | 150 | 0.01 | 3.1 | 3.4×10$^{14}$ |
| 50 | 175 | 0.1 | 3.2 | 2.4×10$^{14}$ |
| 50 | 200 | 0.3 | 3.2 | 5.5×10$^{13}$ |
| 50 | 225 | 1.0 | 3.2 | 5.5×10$^{12}$ |
| 50 | 240 | 2.26 | 3.2 | 1.6×10$^{12}$ |

*Example 3*

A mixture of 648 parts of 1,4-bis(cyclopentadienyl)-trans-butene-2 [=bis(cyclopentadienyl) compound II] and 316 parts of a viscid, solvent-free copolymer of butadiene and styrene in the weight ratio of 4:1, average molecular weight 8000 to 10,000, having an iodine number of about 300, marketed under the trade name "Buton 100" by Messrs. Esso, is cured in the same moulds and under the same conditions as used in Example 2. There result hard, clear, perfect castings which possess the following properties:

Flexural strength _____ kg./cm.$^2$ __ 640
Impact strength _____ cm. kg./cm.$^2$ __ 5.8
Modulus of elasticity _____ kg./mm.$^2$ __ 382
Heat distortion point according to Martens
(DIN) _____ °C __ 78

Dependence of the dielectric properties of the castings on the frequency and the temperature:

| Frequency, sec.$^{-1}$ | Temperature, °C. | Dielectric loss factor, tg $\delta \times 10^2$ | Dielectric constant, $\epsilon$ | Specific resistance, ohm-cm. |
|---|---|---|---|---|
| 50 | 20 | 0.03 | 2.8 | |
| 500 | 20 | 0.45 | 2.6 | |
| 10$^3$ | 20 | 0.62 | 2.7 | |
| 10$^4$ | 20 | 0.72 | 2.7 | |
| 10$^5$ | 20 | 0.48 | 2.5 | |
| 10$^6$ | 20 | 0.51 | 2.4 | |
| 10$^7$ | 20 | 0.55 | 2.4 | |
| 50 | 25 | 0.03 | 2.8 | 1.7×10$^{17}$ |
| 50 | 50 | 0.03 | 2.8 | 3.5×10$^{16}$ |
| 50 | 76 | 0.05 | 2.8 | 1.5×10$^{17}$ |
| 50 | 100 | 0.07 | 2.8 | 6.7×10$^{15}$ |
| 50 | 125 | 0.01 | 2.8 | 7.6×10$^{14}$ |
| 50 | 150 | 0.11 | 2.8 | 3.4×10$^{14}$ |
| 50 | 175 | 0.26 | 2.8 | 1.5×10$^{14}$ |
| 50 | 200 | 0.79 | 2.8 | 1.6×10$^{13}$ |
| 50 | 225 | 3.21 | 2.8 | 1.4×10$^{11}$ |
| 50 | 240 | 6.31 | 2.8 | 4.6×10$^{11}$ |

*Example 4*

A mixture of 525 parts of a dimeric dicyclopentadienyl-dimethylsilane having a molecular weight of 390 [=bis(cyclopentadienyl) compound III] and 475 parts of the butadiene-styrene copolymer "Buton 100" described in Example 3, is cast into moulds and cured as described in Example 2. The resulting hard, clear, perfect castings display the following properties:

Flexural strength _____ kg./cm.$^2$ __ 900
Impact strength _____ cm. kg./cm.$^2$ __ 8.3
Modulus of elasticity _____ kg./mm.$^2$ __ 450
Heat distortion point according to Martens
(DIN) _____ °C __ 62

Dependence of the dielectric properties of the castings on the frequency and the temperature:

| Frequency, sec.$^{-1}$ | Temperature, °C. | Dielectric loss factor, tg $\delta \times 10^2$ | Dielectric constant, $\epsilon$ | Specific resistance, ohm-cm. |
|---|---|---|---|---|
| 50 | 20 | 9.18 | 2.6 | |
| 500 | 20 | 0.87 | 2.7 | |
| 10$^3$ | 20 | 0.81 | 2.7 | |
| 10$^4$ | 20 | 9.64 | 2.7 | |
| 10$^5$ | 20 | 9.29 | 2.4 | |
| 10$^6$ | 20 | 0.33 | 2.3 | |
| 10$^7$ | 20 | 0.41 | 2.4 | |
| 50 | 25 | 0.18 | 2.6 | 8.8×10$^{16}$ |
| 50 | 50 | 0.33 | 2.6 | 2.7×10$^{16}$ |
| 50 | 75 | 0.53 | 2.6 | 8.3×10$^{15}$ |
| 50 | 100 | 9.49 | 2.7 | 7.8×10$^{14}$ |
| 50 | 125 | 0.32 | 2.7 | 4.3×10$^{12}$ |
| 50 | 150 | 9.50 | 2.7 | 5.0×10$^{12}$ |
| 50 | 175 | 1.95 | 2.8 | 1.0×10$^{12}$ |
| 50 | 200 | 6.50 | 2.8 | 3.4×10$^{11}$ |

*Example 5*

Dimetric $\alpha,\alpha'$-bis(cyclopentadienyl)-paraxylene [=bis(cyclopentadienyl) compound IV] is cast in aluminium moulds as in Example 1 and cured for 2 hours at 150° C. and then for 24 hours at 180° C. The resulting hard, perfect castings possess the following properties:

Flexural strength _____ kg./cm.$^2$ __ 1230
Impact strength _____ cm. kg./cm.$^2$ __ 9.6
Modulus of elasticity _____ kg./mm.$^2$ __ 260
Heat distortion point according to Martens
(DIN) _____ °C __ 131

Dependence of the dielectric properties of the castings on the frequency and the temperature:

| Frequency, sec.$^{-1}$ | Temperature, °C. | Dielectric loss factor, tg $\delta \times 10^2$ | Dielectric constant, $\epsilon$ | Specific resistance, ohm-cm. |
|---|---|---|---|---|
| 50 | 22 | 0.08 | 2.7 | ~2×10$^{17}$ |
| 50 | 40 | 0.08 | 2.7 | ~2×10$^{17}$ |
| 50 | 55 | 0.12 | 2.7 | 5.6×10$^{16}$ |
| 50 | 75 | 0.12 | 2.7 | 4.4×10$^{16}$ |
| 50 | 100 | 0.10 | 2.7 | 4.4×10$^{15}$ |
| 50 | 125 | 0.11 | 2.7 | 7.6×10$^{14}$ |
| 50 | 150 | 0.22 | 2.7 | 6.4×10$^{13}$ |
| 50 | 175 | 0.95 | 2.7 | 4.4×10$^{12}$ |
| 50 | 190 | 2.80 | 2.7 | 8.8×10$^{11}$ |
| 50 | 210 | 11.0 | 2.8 | 1.5×10$^{11}$ |
| 50 | 20 | 0.08 | 2.7 | |
| 10$^3$ | 20 | 0.87 | 2.7 | |
| 10$^4$ | 20 | 0.52 | 2.7 | |
| 10$^5$ | 20 | 0.20 | 2.7 | |
| 10$^6$ | 20 | 0.20 | 2.6 | |
| 10$^7$ | 20 | 0.30 | 2.6 | |

Among the hitherto commonly used thermosetting resins for electrical insulations by far the best results have been obtained with epoxies. Therefore, the properties of the new insulating compounds described in the preceding examples are compared with the properties of an epoxy resin mixture, described below, which is especially suitable for the manufacture of electrical insulating materials. With the castings prepared from the said mixture the dependence of the dielectric properties on the frequency and the temperature was measured:

100 parts of an epoxy resin prepared in known manner by reacting bis(para - hydroxyphenyl)dimethylmethane (=bisphenol A) and epichlorohydrin in the presence of alkali, having an epoxide equivalence of 2.4 per kg. and a softening point of 50° C., and 30 parts of phthalic anhydride were mixed to homogeneity at 100° C. The mixture was poured into moulds 130×2 mm. and cured for 24 hours at 140° C. The resulting test sheets revealed the dielectric properties:

| Frequency, sec.$^{-1}$ | Temperature, °C. | Dielectric loss factor, tg $\delta \times 10^2$ | Dielectric constant, $\epsilon$ | Specific resistance, ohm-cm. |
|---|---|---|---|---|
| 50 | 20 | 0.35 | 3.8 | $2 \times 10^{16}$ |
| 50 | 40 | 0.35 | 3.85 | $1.9 \times 10^{16}$ |
| 50 | 60 | 0.30 | 3.9 | $1.7 \times 10^{16}$ |
| 50 | 80 | 0.35 | 3.9 | $2.0 \times 10^{16}$ |
| 50 | 100 | 0.45 | 3.8 | $2.0 \times 10^{15}$ |
| 50 | 120 | 0.85 | 3.95 | $2.0 \times 10^{13}$ |
| 50 | 130 | 2.7 | 4.25 | |
| 50 | 140 | 8.3 | 5.1 | $2.2 \times 10^{11}$ |
| 50 | 20 | 0.35 | 3.8 | |
| 200 | 20 | 0.50 | | |
| 400 | 20 | 0.60 | | |
| $10^3$ | 20 | 0.95 | 2.6 | |
| $10^4$ | 20 | 1.65 | 2.6 | |
| $10^5$ | 20 | 3.30 | 3.4 | |
| $10^6$ | 20 | 4.25 | 3.3 | |
| $10^7$ | 20 | 4.55 | 3.1 | |
| $5 \times 10^7$ | 20 | 3.0 | 3.1 | |
| $10^8$ | 20 | 2.83 | 2.8 | |
| $2.5 \times 10^8$ | 20 | 4.57 | 3.0 | |
| $0.96 \times 10^{10}$ | 20 | 5.0 | 2.4 | |

What is claimed is:

1. Process for encapsulating an electrical conductor which comprises applying to the conductor a composition comprising
(1) an oligomeric bis(cyclopentadienyl) compound which is soluble in organic solvents and which corresponds to the general formula

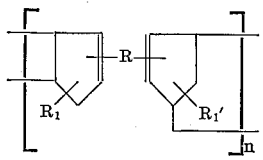

where R is a member selected from the group consisting of

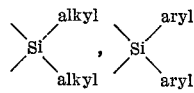

divalent aliphatic hydrocarbon radical, divalent cycloaliphatic hydrocarbon radical and divalent araliphatic hydrocarbon radical, $R_1$ and $R_1'$ are members selected from the class consisting of hydrogen atom and the methyl group, and $n$ is an integer of at least 2 and at the most 20, and
(2) a polymer which is soluble in organic solvents and is selected from the group consisting of homopolymers of butadiene, homopolymers of isoprene, copolymers of butadiene with a member selected from the group of ethylene, propylene and styrene, and copolymers of isoprene with a member selected from the group consisting of ethylene, propylene and styrene, and directly converting said composition by heating to the cured, insoluble and infusible state.

2. Process for encapsulating an electrical conductor which comprises applying to the conductor a composition comprising dimeric 1,4-bis(cyclopentadienyl)-butene-2, and directly converting said composition by heating to the cured, insoluble and infusible state.

3. Process for encapsulating an electrical conductor which comprises applying to the conductor a composition comprising
(1) dimeric 1,4-bis(cyclopentadienyl)-butene-2, and
(2) a polymer which is soluble in organic solvents and is selected from the group consisting of homopolymers of butadiene, homopolymers of isoprene, copolymers of butadiene with a member selected from the group of ethylene, propylene and styrene, and copolymers of isoprene with a member selected from the group consisting of ethylene, propylene and styrene, and directly converting said composition by heating to the cured, insoluble and infusible state.

4. Process for encapsulating an electrical conductor which comprises applying to the conductor a composition comprising an oligomeric bis(cyclopentadienyl) compound which is soluble in organic solvents and which corresponds to the general formula

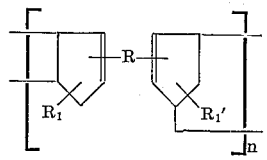

where R is a member selected from the group consisting of

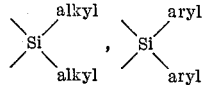

divalent aliphatic hydrocarbon radical, divalent cycloaliphatic hydrocarbon radical and divalent araliphatic hydrocarbon radical, $R_1$ and $R_1'$ are members selected from the class consisting of hydrogen atom and the methyl group, and $n$ is an integer of at least 2 and at the most 20, and after potting the electrical components the composition is directly converted by heating into the cured, insoluble and infusible state.

References Cited
UNITED STATES PATENTS

| | | | |
|---|---|---|---|
| 2,726,232 | 12/1955 | Upson | 260—93.1 |
| 3,012,007 | 12/1961 | Gaflisch et al. | 260—47 |
| 3,022,200 | 2/1962 | Koerner et al. | 117—218 |
| 3,028,265 | 4/1962 | Wareham | 117—232 |

ALFRED L. LEAVITT, *Primary Examiner.*

W. L. JARVIS, *Assistant Examiner.*